3,405,082
NOVEL HIGH-GLOSS INK FOR LITHOGRAPHIC
PRINTING
Robert George Savageau, Pompton Lakes, N.J., assignor to Interchemical Corporation, New York, N.Y., a corporation of Ohio
No Drawing. Filed Apr. 20, 1966, Ser. No. 543,784
7 Claims. (Cl. 260—22)

ABSTRACT OF THE DISCLOSURE

A lithographic printing ink that contains an aliphatic hydrocarbon solvent, and gelled glycerol ester type drying oil, and a polymer formed by condensation polymerization of rosin, pentaerythritol or glycerol, and a dibasic acid such as maleic acid, fumaric acid, or a phthalic acid.

---

This invention relates to a novel ink very useful in lithographic printing. More particularly, it relates to a novel ink for high quality printing with excellent gloss in the publication field.

The lithographic ink of this invention may be termed a "publication ink" because it may be most advantageously used in producing high gloss printing on stocks used in magazines, catalogs and advertising brochures. There is a continual demand in this area of printing for an inexpensive ink giving printing of high gloss as well as excellent scratch, rub and block resistance. In addition, because the ink is to be used in high-speed printing it must be capable of setting within 0.2 to 20 seconds at a temperature from 150° F. to 300° F.

I have now discovered a novel ink which gives a high gloss which is without precedent in an ink that retains all of the aforementioned desirable properties.

The basis of the present invention and of the ink having such an unusual combination of properties appears to be the use of gelled linseed oil as well as the reaction under heat of the gelled oil with a polymer already formed by the condensation polymerization of rosin, a polyol such as pentaerythritol or glycerin, and a dibasic acid which may be either isophthalic acid, a phthalic acid including terephthalic acid and phthalic anhydride, maleic acid or fumaric acid as well as acids in the same class as succinic, adipic, azelaic and sebacic acids. Preferably, at least 5% of the groups originally in the polyol should remain unreacted after the condensation polymerization in order to provide sites for the reaction of the gelled linseed oil with the polymer.

The condensation polymer may be produced in the conventional manner with heat alone sufficing to support the reaction. Then, this preformed condensation polymer is reacted with the gelled linseed oil with heat preferably in excess of 450° F. to produce the polymeric reaction products necessary for the inks of this invention.

Surprisingly, I have found that when an ungelled linseed oil is used in place of the gelled linseed oil, there is a marked difference in gloss as well as a downgrading of the block resistance of the material.

On the other hand, if a gelled linseed oil is used but not reacted with the already formed condensation polymer but merely mixed with said polymer under ambient conditions, the mixture has a distinct gel structure and when the mixture is incorporated into an ink, the ink also takes on a gel structure. In addition, the link is difficult to handle and mists on the press.

In the ink of this invention the linseed oil modified polymer is dissolved in a volatile aliphatic solvent to provide the vehicle. The solvent is present in conventional amounts, e.g., in the order of from 0.2 to 2.0 parts of solvent for each part of polymer. Unless otherwise indicated, all proportions in this specification and claims are by weight.

Any conventional pigments may be used in conventional amounts.

The addition of a wax will enhance the scuff resistance of the inks of this invention. The wax may be any of the conventional waxes used in printing inks such as microcrystalline, carnauba, but is preferably a polyethylene wax and most preferably polyethylene having a molecular weight of 10,000 or greater. If a wax is used preferably from .015 to .03 part of wax are used for each part of oil modified polymer.

Before reaction with the gelled linseed oil, the polymer is preformed by the condensation polymerization of preferably from 15 to 20 parts rosin, 1 to 3 parts of the polyol and from 0.5 to 1.5 parts of the dibasic acid. Then preferably from 10 to 40 parts of gelled linseed oil are reacted with the preformed polymer to produce the polymer of this invention.

The following example will illustrate the practice of this invention:

EXAMPLE 40 lbs. of rosin and 4.7 lbs. of pentaerythritol are mixed and heated at 525° F. to 565° F. over a period of 1 hour. Then 2.4 lbs. of isophthalic acid are added and heating is continued at 565° F. for about 1 hour. Then 11.9 lbs. of gelled linseed oil are added and heating at 565° F. is continued for about 15 minutes, after which 40 lbs. of an aliphatic hydrocarbon solvent having a boiling range of 470–510° F. and a K.B. number of 27.6 are added and the solution is permitted to cool.

To 64 parts of the above vehicle, there are added 4 parts of polyethylene wax (M.W. 10,000) 1 part microcrystalline wax, 10 parts of the above hydrocarbon solvent, 12 parts of carbon black, 1 part of cobalt drier and 8 parts of alkali blue.

The resulting ink is used in a conventional lithographic press for web printing, the printed web being heat set for a period of 1 second at 300° F. The printed matter is very high in gloss and has excellent scratch, rub and block resistance.

As a control, this example is repeated using the same conditions, procedure, ingredients and proportions except that ungelled linseed oil bodied to a viscosity of 175 poises is used in place of gelled linseed oil. There is marked reduction of gloss and block resistance in ink employing the composition with the ungelled linseed oil in comparison with the ink with the gelled linseed oil. The example is also repeated with the same conditions, procedure, ingredients and proportions except that the gelled linseed oil is not reacted with the rosin/polyol/dibasic acid polymer but is merely mixed with the polymer at ambient temperature. The resulting ink has a gel-like structure and flies on the press while the ink of this example does not fly on the press and has a fluid ungelled structure.

While gelled linseed oil is the preferred drying oil, other drying oils such as oiticica, China wood and even soya bean oil will give similar results when gelled.

The example may be repeated using glycerin in place of pentaerythritol and any one of the following dibasic acids in place of isophthalic acid:

Terephthalic acid
Phthalic anhydride
Maleic anhydride
Fumaric acid

While there have been described what is at present considered to be the preferred embodiments of this invention, it will be obvious to those skilled in the art that

What is claimed is:

1. A printing ink comprising pigment dispersed in a volatile aliphatic hydrocarbon solvent solution of the product of the reaction under heat above 450° F. of 10 to 40 parts of a gelled drying oil selected from the group consisting of linseed oil, oiticica oil, China wood oil and soya oil, and a polymer formed by the condensation polymerization of 15 to 20 parts rosin, 1 to 3 parts of a polyol selected from the group consisting of pentaerythritol and glycerin and 0.5 to 1.5 parts of a dibasic acid selected from the group consisting of isophthalic acid, phthalic acid, terephthalic acid, maleic acid and fumaric acid, at least 5% of the hydroxyl groups of the polyol remaining unreacted after the condensation polymerization.

2. The ink of claim 1 wherein said drying oil is linseed oil.

3. The ink of claim 2 wherein said dibasic acid is phthalic acid in the form of phthalic anhydride.

4. The ink of claim 2 wherein said dibasic acid is isophthalic acid.

5. The ink of claim 2 wherein said polyol is glycerin.

6. The ink of claim 2 wherein said polyol is pentaerythritol.

7. The ink of claim 4 wherein said polyol is pentaerythritol.

References Cited

UNITED STATES PATENTS

| | | | |
|---|---|---|---|
| 2,057,766 | 10/1936 | Brubaker | 260—26 |
| 2,154,471 | 4/1939 | Rosenblum | 260—26 |
| 2,322,197 | 6/1943 | Oswald | 260—26 |
| 3,266,914 | 8/1966 | Varron | 106—29 |
| 3,342,764 | 9/1967 | Varron et al. | 260—22 |

OTHER REFERENCES

Department of Commerce, Circular of the Bureau of Standards, S. W. Stratton, Director, No. 53, 1st edition, March 29, 1915, pages 31 and 32.

DONALD E. CZAJA, *Primary Examiner.*

R. W. GRIFFIN, *Assistant Examiner.*